(12) United States Patent
Lassen (10) Patent No.: US 11,847,076 B2
(45) Date of Patent: *Dec. 19, 2023

(54) PRE-PROCESSING OF WAVEFORM DATA USING AUTONOMOUS WAVEFORM CIRCUITRY AND RELATED APPARATUSES AND METHODS

(71) Applicant: Microchip Technology Incorporated, Chandler, AZ (US)

(72) Inventor: Jacob Lunn Lassen, Saupstad (NO)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/805,642

(22) Filed: Jun. 6, 2022

(65) Prior Publication Data

US 2022/0300443 A1    Sep. 22, 2022

Related U.S. Application Data

(63) Continuation of application No. 16/947,688, filed on Aug. 12, 2020, now Pat. No. 11,354,260.

(60) Provisional application No. 62/893,617, filed on Aug. 29, 2019.

(51) Int. Cl.
*G06F 13/28* (2006.01)
*G06F 13/16* (2006.01)

(52) U.S. Cl.
CPC .......... *G06F 13/28* (2013.01); *G06F 13/1668* (2013.01)

(58) Field of Classification Search
CPC .............................. G06F 13/28; G06F 13/1668
See application file for complete search history.

(56) References Cited

U.S. PATENT DOCUMENTS

| | | | |
|---|---|---|---|
| 5,184,310 A | 2/1993 | Takenouchi | |
| 5,689,079 A | 11/1997 | Kosugi | |
| 9,256,399 B2 | 2/2016 | Hanssen | |
| 10,346,324 B2 | 7/2019 | Lassen et al. | |
| 11,354,260 B2 * | 6/2022 | Lassen | G06F 13/1668 |
| 2006/0123071 A1 | 6/2006 | Sonoda et al. | |
| 2012/0173772 A1 | 7/2012 | Durand et al. | |

FOREIGN PATENT DOCUMENTS

JP    H03-253295 A    11/1991

OTHER PUBLICATIONS

International Search Report from International Application No. PCT/US2020/070405, dated Nov. 20, 2020, 4 pages.
International Written Opinion from International Application No. PCT/US2020/070405, dated Nov. 20, 2020, 7 pages.

* cited by examiner

*Primary Examiner* — Tammara R Peyton
(74) *Attorney, Agent, or Firm* — TraskBritt (57) ABSTRACT

Waveform circuitry and related apparatuses and methods are disclosed. An apparatus includes a memory device to store waveform data corresponding to a waveform, a processor, and a waveform circuitry to autonomously pre-process the waveform data independently from the processor and provide the pre-processed waveform data to one or more peripheral devices. A pre-processed waveform corresponding to the pre-processed waveform is data different from the waveform.

20 Claims, 6 Drawing Sheets

PRE-PROCESSING OF WAVEFORM DATA USING AUTONOMOUS WAVEFORM CIRCUITRY AND RELATED APPARATUSES AND METHODS

CROSS-REFERENCE TO RELATED APPLICATIONS

This application is a continuation of U.S. patent application Ser. No. 16/947,688, filed Aug. 12, 2020, now U.S. Pat. No. 11,354,260, issued Jun. 7, 2022, which claims the benefit under 35 U.S.C. § 119(e) of U.S. Provisional Patent Application Ser. No. 62/893,617, filed Aug. 29, 2019, and titled "MCU WITH BUFFER/DMA WITH HARDWARE SCALING OF DATA AND TIMING-CONTROLLED TRANSFERS," the entire disclosure of each of which is hereby incorporated herein by reference.

BACKGROUND

In many embedded control systems and other computing systems movement of data between peripheral devices and a host, or between peripheral devices, may amount to a significant amount of data traffic on the various busses that may exist in such systems. Direct Memory Access (DMA) controllers may be used to manage these data transfers so that the host does not need to manage movement of each data element. Conventional DMA controllers, however, may still have significant overhead management that a host needs to perform, and DMA controllers are generally most efficient with bulk data transfers.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. Other embodiments, however, may be utilized, and structural, material, and process changes may be made without departing from the scope of the disclosure. The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code, without limitation) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts may be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

For ease of following the description, for the most part element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, the terms "electrically connect" and "electrically connected," refer to both direct electrical connections between elements without intervening elements and indirect electrical connections between elements with one or more intermediate elements.

Reference throughout this specification to "one embodiment," "an embodiment," or similar language means that a particular feature, structure, or characteristic described in connection with the indicated embodiment is included in at least one embodiment of the present disclosure. Thus, the phrases "in one embodiment," "in an embodiment," and similar language throughout this specification may, but do not necessarily, all refer to the same embodiment.

In some systems it may be helpful to generate waveforms or periodic signals using a waveform generator such as a pulse width modulator (PWM) or a digital to analog converter (DAC), without limitation, to generate a signal having a specific waveform. A waveform generator may be provided with waveform data that defines the waveform. Provision of waveform data to the waveform generator may be performed by a central processing unit (CPU). In some cases, waveforms may be updated very frequently, and may be done in real-time with strict timing constraints. A load on the CPU may scale with update frequency, which affects the rest of the real-time capabilities of a system including the CPU (e.g., a microcontroller (MCU) or other system, without limitation) such as to perform other tasks or be power efficient, without limitation.

A direct memory access (DMA) controller may be used to transfer waveform data to a waveform generator and thereby reduce the load on the CPU. Many DMA controllers, however, are limited to transferring data, which may be insufficient for some waveform management tasks. For example, in addition to transferring waveform data, waveform management tasks may also involve scaling of the waveform data to control the amplitude of the waveform, shaping of the waveform, modifying timing of the waveform (e.g., frequency and/or phase of the waveform, without limitation), interpolation of the waveform data, and/or filtering of the waveform data.

Although these waveform management tasks (e.g., waveform generation, scaling, shaping, timing, interpolation, filtering, without limitation) may be performed using a CPU, intervention by the CPU to perform waveform management tasks involves frequent interrupts to other operations of the CPU to free up processing bandwidth to perform the waveform management tasks. Waveform data is processed (e.g., multiplication/scaling, without limitation) before passing the data to the PWM/DAC, which represents a significant load on the CPU.

Further, in addition to scaling waveform data it is often desirable to interpolate data from a waveform data-table (e.g., buffer, without limitation), so that the memory consumption is minimized, by storing a more compressed version of the waveform than what is used to generate the actual waveform. In other words, the quality (e.g., smoothness, without limitation) of the waveform may be improved through interpolation. Values from the waveform may be interpolated to reduce the size of the stored waveform (e.g., using a hardware digital filter such as an averaging filter, without limitation). Performing the interpolation using software executed by the CPU is possible, but increases the load on the CPU and generates a high number of interrupts, and the interrupt frequency increases with the frequency of the waveform to be generated.

As one example of how DMA controllers known to the inventors of this disclosure move waveform data, waveform data corresponding to a waveform may be stored in a table in memory. The waveform data may be transferred by DMA to a waveform generating peripheral (e.g., a PWM or a DAC, without limitation). DMA, however, does not have the ability to perform pre-processing of waveform data. If the waveform is to be scaled (change in amplitude) before transfer to the waveform generating peripheral, the CPU will intervene by performing the scaling on the waveform data in advance of DMA transfer, and store the scaled waveform data to a table in memory (e.g., overwriting the table including the original waveform data or creating a new table including the scaled waveform data). Otherwise the CPU may scale the waveform data and perform the transfer itself instead of the DMA. Both approaches (the CPU scaling the waveform data prior to a DMA transfer, the CPU itself scaling the waveform data and performing the transfer) involve intervention from the CPU, which is contrary to the direct nature of a DMA transfer. Moreover, there may be instances where the frequency of the waveform is to be changed, and the DMA may not be capable of performing the frequency change.

In addition, a DMA controller is typically controlled by a separate timing mechanism than that of the consumer of the data (e.g., the peripheral such as the PWM or DAC, without limitation). This may prevent the DMA controller from providing accurate data for time samples of the consumer of the data that do not align with time samples of waveform data provided by the DMA (e.g., due to missing data in the table for those misaligned sample times of the consumer of the data, without limitation). For example, the consumer of the data may rely on a DMA-provided value for a waveform data sample that corresponds to a slightly different point in time (in DMA time) than that of a sample time (in consumer time) of the consumer of the data. Since a waveform corresponding to the waveform data varies with time, a true value of the waveform at the consumer's sample time would be different from that of the provided value corresponding to the DMA's time. Accordingly, values for misaligned sample times between the DMA and the consumer may be inaccurate. Also, if an input rate of the consumer (e.g., PWM/DAC) of the waveform data is off sync from a sample rate of the waveform data stored in memory, a DMA may fail to provide a waveform data point for input samples input to the consumer, amounting to missing data points.

As a specific example, a sine wave may be generated to control a brushless direct current (BLDC) motor. The amplitude and frequency are to be adjusted to a desired speed and torque of the BLDC motor.

Disclosed herein is autonomous, run-time scaling/preprocessing of data transferred from a buffer/memory to a peripheral module such as a PWM or DAC. An amplitude of a waveform may be controlled autonomously without involving the CPU. One or more embodiments may be integrated into an autonomous memory access controller.

As discussed herein, dynamically interpolating waveform data may ensure that the frequency of the waveform is correct, that timing can be dynamically changed with a minimum of overhead, and that the size of the buffer/data tables can be minimized.

Some embodiments disclosed herein relate to pre-processing of data to generate a waveform before passing waveform data to the PWM/DAC. Accordingly, real-time performance may be improved, CPU load may be reduced, and memory consumption of waveform generating applications may be reduced—as compared to existing techniques known to the inventors of this disclosure.

In some embodiments an autonomous memory access (AMA) controller may be used to access data (e.g., waveform data) stored by an autonomous circular buffer (ACB). More information relating to ACBs is discussed in U.S. Pat. No. 10,346,324, filed Jan. 18, 2018, and titled "DEVICES AND METHODS FOR AUTONOMOUS HARDWARE MANAGEMENT OF CIRCULAR BUFFERS," the entire disclosure of which is hereby incorporated herein by reference.

In some embodiments an autonomous memory access (AMA) controller is disclosed that is configured to scale data, interpolate data, adjust frequency of transfers dynamically, perform other operations, or any combination thereof.

One or more embodiments include an autonomous memory access controller with data and time scaling (e.g., changing of frequency and/or phase, without limitation). The autonomous memory access controller may reduce CPU load for applications that use dynamic scaling of waveforms (e.g., intelligent power and motor control applications, without limitation), reduce memory consumption for waveform tables, and improve smoothness of generated waveforms.

Figure 1:
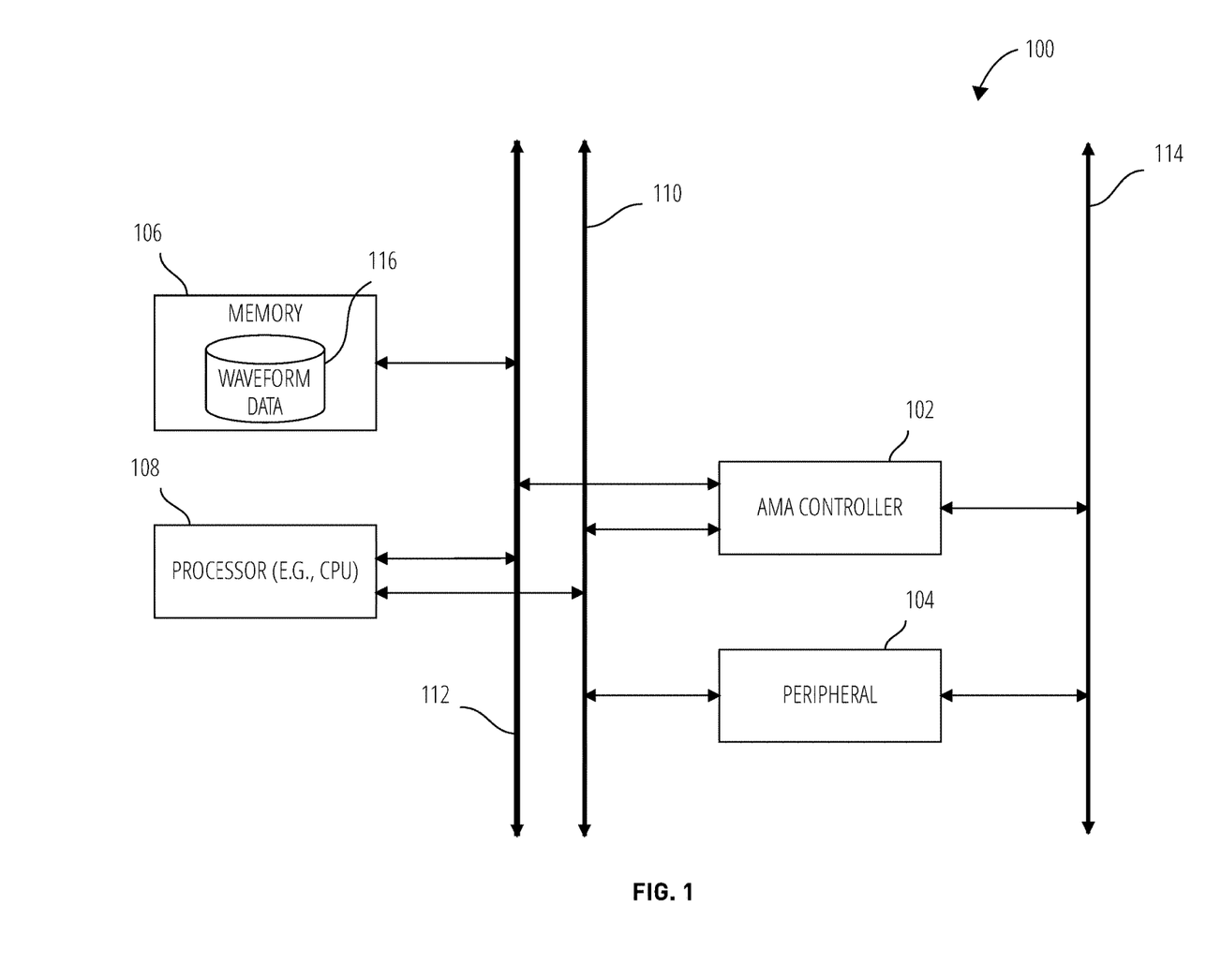
FIG. 1 is a block diagram of a computing system including a processor, memory, a peripheral device, and an autonomous memory access (AMA) controller.

FIG. 1 is a block diagram of a computing system 100 including a processor 108 (e.g., a host processor, a CPU, without limitation), a memory 106 a peripheral device 104, and an autonomous memory access (AMA) controller 102. As non-limiting examples, the computing system 100 may be a microcontroller-type embedded system, a user-type computer, a file server, a computer server, a notebook computer, a tablet, a handheld device, a mobile device, or other similar computer system for executing software. Computer, computing system, and server may be used interchangeably herein to indicate a system for practicing embodiments of the present disclosure. The computing system 100 is configured for executing software programs containing computing instructions and includes one or more processors, memory, storage, user interface elements, and one or more communication elements.

The processor 108 may be configured for executing a wide variety of operating systems and applications including computing instructions for carrying out all or portions of embodiments of the present disclosure.

The memory 106 may be used to hold computing instructions, data structures, and other information for performing a wide variety of tasks including performing embodiments of the present disclosure. By way of example, and not limitation, the memory may include Synchronous Random Access Memory (SRAM), Dynamic RAM (DRAM), Read-Only Memory (ROM), Flash memory, and the like. By way of non-limiting example, the memory 106 may be configured to store waveform data 116 that may be used by the peripheral device 104.

The memory 106 may include other types of memory devices, including volatile storage devices or non-volatile storage devices, configured to store information. Examples of other types of memory include nano RAM (NRAM), nanocrystal wire-based memory, silicon-oxide based sub-10 nanometer process memory, graphene memory, Silicon-Oxide-Nitride-Oxide-Silicon (SONOS), resistive random-access memory (ReRAM), programmable metallization cell (PMC), conductive-bridging RAM (CBRAM), magneto-resistive RAM (MRAM), phase change RAM (PCRAM), phase change memory, or other solid-state storage media.

In the illustrated embodiment, the processor 108 communicates with the memory 106 on a memory bus 112. Also, the processor 108 communicates with peripheral devices (e.g., peripheral device 104, without limitation) on a peripheral bus 110. The peripheral devices (e.g., peripheral device 104, without limitation) may also be coupled to an event system bus 114. Additional details regarding one type of event system bus, as well as overall microcontroller system configurations, may be found in U.S. Pat. No. 9,256,399 entitled "BREAKING PROGRAM EXECUTION ON EVENTS," filed on Jun. 27, 2013, the disclosure of which is incorporated herein in its entirety by this reference.

The AMA controller 102 is configured to communicate on the memory bus 112, the peripheral bus 110, and the event system bus 114.

Of course, a person having ordinary skill in the art will recognize that embodiments of the present disclosure may be used in other system configurations. For example, embodiments may be configured in a computer type system using an interrupt type system for the event controls. Moreover, this type of system may have a separate bus (e.g., an Input/Output bus, without limitation) for communication between the processor 108 and any peripheral devices (e.g., peripheral device 104, without limitation). In addition, this type of system may include the AMA controller 102 as communicating on the memory bus 112, which may be coupled directly with the memory 106 and processor 108, and communicate with the peripheral devices (e.g., peripheral device 104, without limitation) on such an I/O bus.

Many other system configurations are possible for embodiments of the present disclosure.

Figure 2:
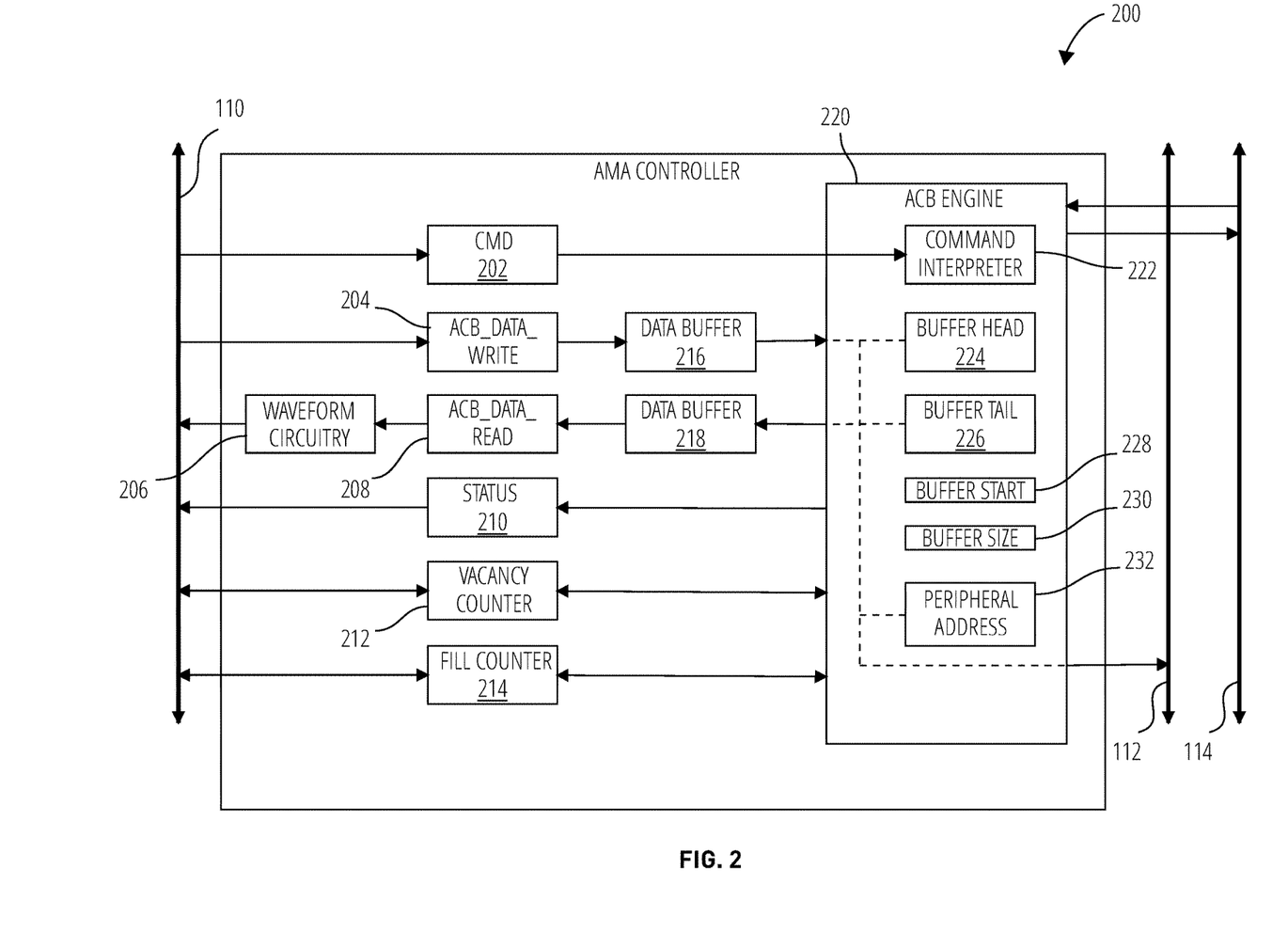
FIG. 2 is a detailed block diagram of an AMA controller, according to some embodiments.

FIG. 2 is a detailed block diagram of an AMA controller 200, according to some embodiments. AMA controller 200 may be used in place of an AMA controller 102 of FIG. 1, in a computing system 100 when the peripheral device 104 is a waveform generating peripheral. Referring to FIG. 1 and FIG. 2 together, the AMA controller 200 may be configured as a controller for temporary storage that ensures an efficient asynchronous (or synchronous) transfer of data between software tasks and hardware devices or between two hardware devices (for example, two peripherals). With the AMA controller 200 of the present disclosure, overhead processes that might have been handled by the processor 108 of the computing system 100 may be off-loaded by implementing an AMA controller in hardware that may operate in close collaboration with other peripherals, such as communication modules, timers, Analog-to-Digital Converters (ADCs) and Digital-to-Analog Converters (DACs).

In embodiments of the present disclosure, the AMA controller 200 controls the movement of waveform data 116 stored in memory 106 (FIG. 1) (or another memory, which is not shown), so that instead of letting the processor 108 provide the waveform data 116 to the peripheral device 104, the processor 108 writes to the memory 106. When the peripheral device 104 is ready to receive the waveform data 116, the AMA controller 200 may move the waveform data 116 from the memory 106 to the destination (e.g., the peripheral device 104). These transfers from the processor 108 to the memory 106 and to the peripheral device 104 may occur sequentially or may occur in parallel.

Of course, transfers may happen in the other direction as well. In other words, the AMA controller 200 may move data coming from the peripheral device 104 to the memory 106 and from the memory 106 to the processor 108.

Turning to FIG. 2, in a peripheral device 104 to processor 108 data transfer, a peripheral writes to an ACB_DATA_WRITE register 204 over the peripheral bus 110. A write data buffer 216 may be coupled to the ACB_DATA_WRITE register 204 to hold the data before it is written to the memory 106 (e.g., in a circular buffer region of the memory 106). In the background (i.e., not seen or managed by the processor 108 or peripheral device 104) AMA controller 200 may use a value in a buffer head register 224 to write the data to the proper location in memory 106. The data may come from the write data buffer 216, if present, or directly from the ACB_DATA_WRITE register 204.

In a processor 108 to peripheral device 104 data transfer, in the background (i.e., not seen or managed by the processor 108 or peripheral device 104), the AMA controller 200 may use a value in a buffer tail register 226 to read data from the proper location in the memory 106. The data may be placed in a read data buffer 218, if present, or directly in an ACB_DATA_READ register 208.

When the processor 108 begins to read data it reads only from the ACB_DATA_READ register 208 with the AMA controller 200 managing all the accesses from the memory 106 and providing the data through the ACB_DATA_READ register 208.

Furthermore, data movements may occur between two peripheral devices rather than between a peripheral device and the processor 108.

The AMA controller 200 may include registers to indicate where in memory 106 the AMA controller 200 should access data. As one example, the registers may include a buffer start register 228 and a buffer size register 230 as shown in FIG. 2. Other embodiments may use a buffer end register (not shown) rather than a buffer size register 230, or any other combination of registers to identify the extents of the data on the memory 106.

AMA controller 200 may include a status register 210 that provides information about available room in the memory 106, number of bytes stored in the memory 106, and so on. A vacancy counter 212 may be included to indicate how many data elements in the memory 106 are not presently used. Similarly, a fill counter 214 may be included to indicate how many data elements in the memory 106 currently include valid data.

The AMA controller 200 may include a control or command register 202 and an ACB engine 220, which ACB engine 220 may include a command interpreter 222 that may be used to control the access type (e.g., peek, write/read leading data element, write/read tailing data element, without limitation).

The ACB engine 220 may include a peripheral address register 232 configured to store an address of a peripheral device. The buffer head register 224, buffer tail register 226, buffer start register 228 and buffer size register 230 are typically considered part of the ACB engine 220.

Data movements may occur from the memory 106 to the peripheral device 104 autonomously without intervention, other than initialization, from the processor 108. By way of non-limiting example, waveform data 116 may be read from memory 106 by the AMA controller 200 and provided to the peripheral device 104 via the peripheral bus 110.

AMA controller 200 includes waveform circuitry 206 arranged between ACB_DATA_READ register 208 and peripheral bus 110. More detail regarding an example of waveform circuitry 206 is provided with reference to waveform circuitry 414 of FIG. 4. Waveform circuitry 206 is configured to perform pre-processing operations on waveform data 116 read from a memory device (e.g., memory 106 of FIG. 1, without limitation) by AMA controller 200 before providing the pre-processed waveform data from ACB_DATA_READ register 208 to a peripheral device (e.g., peripheral device 314 of FIG. 3, without limitation) via peripheral bus 110.

AMA controller 200 may be particularly useful for providing pre-processed waveform data to a peripheral device that includes a waveform generator (e.g., a pulse width modulator (PWM) or a digital to analog converter (DAC), without limitation) configured to generate a waveform responsive to received waveform data. By way of non-limiting example, a waveform generator may be configured to control operation of a waveform-controlled device (e.g., a brushless direct current (BLDC) motor, without limitation) with a waveform generated responsive to waveform data stored in a memory device. In such embodiments the AMA controller 200 may be configured to directly access waveform data 116 stored in memory 106 and pre-process the waveform data 116 without intervention from a processor (e.g., the processor 108 of FIG. 1, without limitation).

Examples of pre-processing operations that the waveform circuitry 206 may be configured to perform on the waveform data 116 include scaling, interpolation, shaping, timing, filtering, other pre-processing operations, or combinations thereof.

Figure 3:
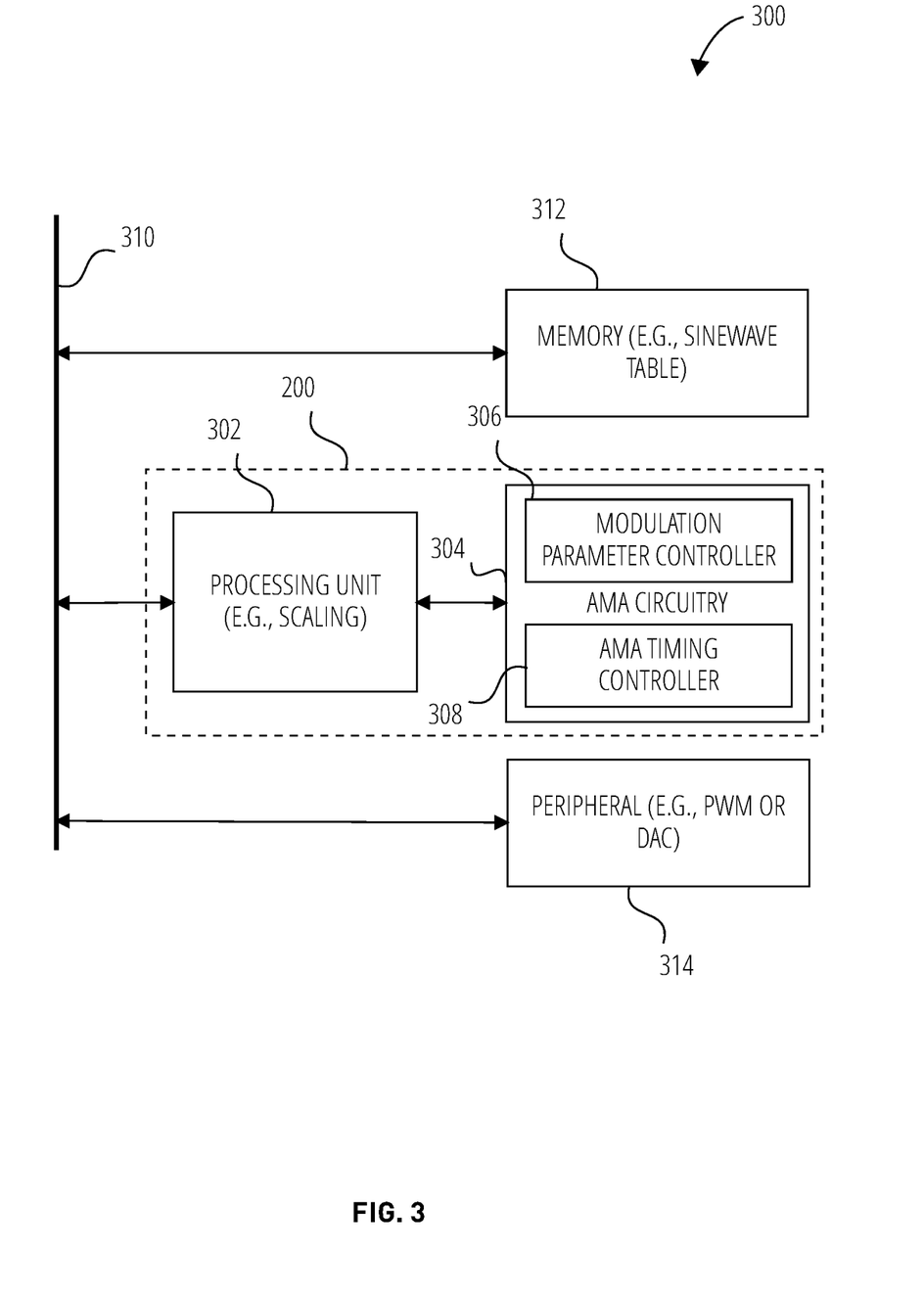
FIG. 3 is a block diagram of a portion of a computing system (e.g., the computing system of FIG. 1, without limitation), according to some embodiments.

FIG. 3 is a block diagram of a portion 300 of a computing system (e.g., the computing system 100 of FIG. 1, without limitation), according to some embodiments. The portion 300 includes AMA controller 200 of FIG. 2, memory device 312 similar to memory 106 of FIG. 1, and peripheral device 314. A processing unit 302 of AMA controller 200 is in communication with memory device 312 and peripheral device 314 via buses 310. Buses 310 include a memory bus (e.g., the memory bus 112 of FIG. 1, without limitation) and a peripheral bus (e.g., the peripheral bus 110 of FIG. 1, without limitation). Peripheral device 314 is configured as a waveform generator (e.g., a PWM or a DAC, without limitation). Memory device 312 includes waveform data stored thereon for controlling peripheral device 314 to generate a waveform. By way of non-limiting example, the waveform data may include a sinewave table, which may include voltage potential values for various points of time to define the waveform. Also by way of non-limiting example the waveform data may include an amplitude and frequency value for a sinewave, a triangle wave, a square wave, a sawtooth wave, or other wave, which may also be sufficient for defining the waveform. As a further non-limiting example the waveform data may include information indicating a type of waveform (e.g., a sinusoidal waveform, a square waveform, a triangular waveform, a sawtooth waveform, without limitation). As another non-limiting example, the waveform data may include Fourier series coefficients and a fundamental frequency for a Fourier series defining a waveform. It will be understood by those of ordinary skill in the art that any periodic waveform may be constructed as a sum of sinusoidal waveforms, such as by using a Fourier series.

AMA controller 200 includes processing unit 302 electrically connected to AMA circuitry 304, which AMA circuitry 304 includes modulation parameter controller 306 and AMA timing controller 308. By way of non-limiting example, processing unit 302 is configured to perform scaling, offsetting, filtering, modulation, interpolation, other operations, or any combination thereof, of a waveform corresponding to waveform data stored by memory device 312. Also by way of non-limiting example, AMA timing controller 308 is configured to initiate AMA transactions, control step size, control interpolation, or any combination thereof of waveform data (e.g., a waveform table such as a sinewave table stored by memory device 312, without limitation). An AMA transaction may be a transfer (e.g., to a peripheral device electrically connected to the busses) of processed (e.g., scaled, without limitation) data. When a time tick of the AMA timing controller 308 occurs the AMA timing controller 308 may calculate a next value of pre-processed waveform data and transfer the next value to the peripheral device, assuming the peripheral device is ready to receive data. The modulation parameter controller 306 is configured to control which of the pre-processing features are to be applied to the waveform data. For example, it may be desired to only scale the waveform data, or to both scale and interpolate the waveform data, or even to scale, offset, filter, and interpolate the waveform data.

Figure 4:
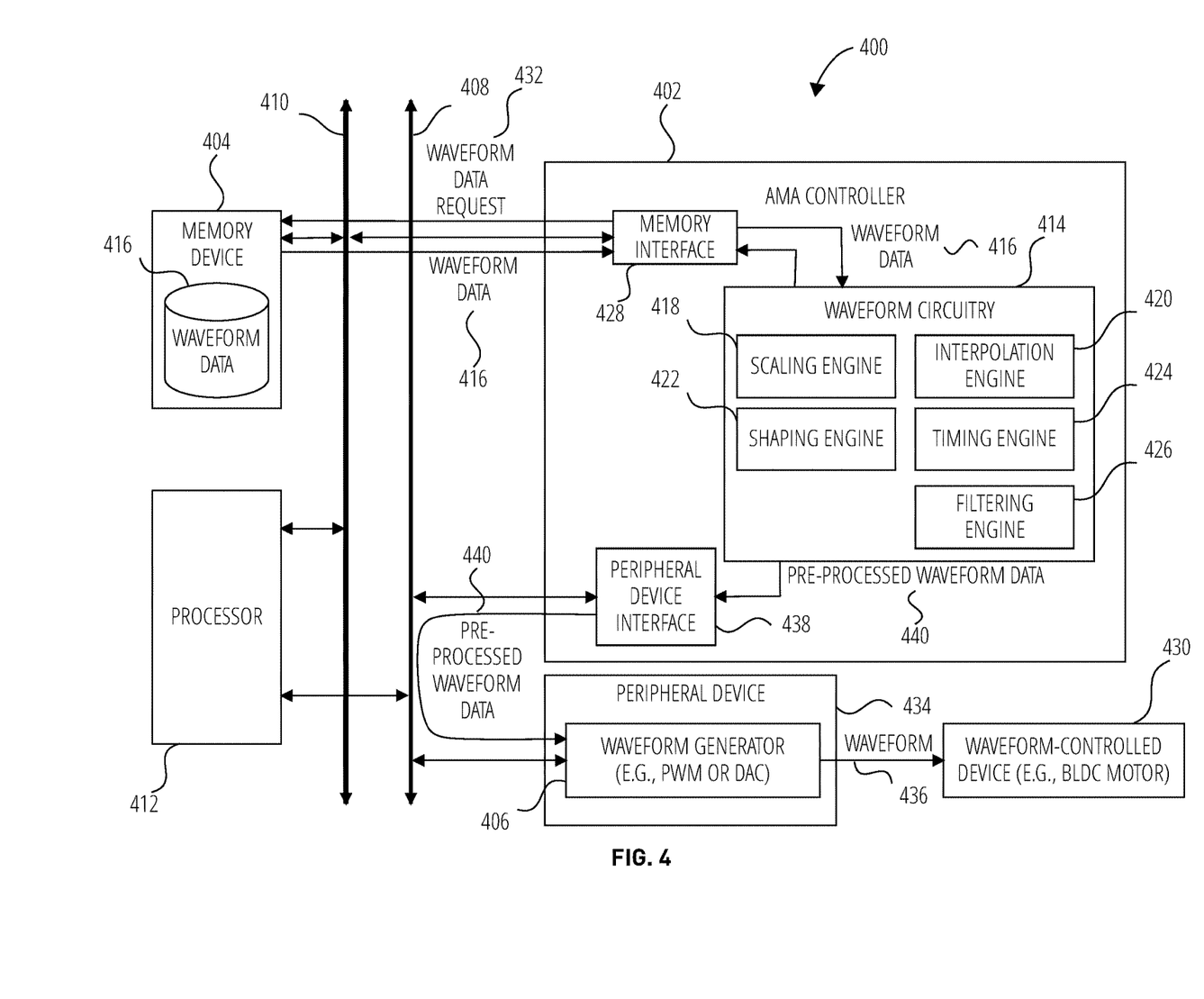
FIG. 4 is another block diagram of a portion of a computing system (e.g., the computing system of FIG. 1, without limitation), according to some embodiments.

FIG. 4 is another block diagram of portion 400 of a computing system (e.g., computing system 100 of FIG. 1, without limitation), according to some embodiments. By way of non-limiting example, the computing system may be an embedded system such as a microcontroller. Portion 400 includes an AMA controller 402, a memory device 404, a processor 412, and a peripheral device 434. Portion 400 also includes memory bus 410 arranged to provide communication between processor 412 and AMA controller 402 to memory device 404. The portion 400 further includes a peripheral bus 408 arranged to provide communication between processor 412 and AMA controller 402 to peripheral device 434.

Peripheral device 434 is configured to operate as a peripheral to processor 412. Peripheral device 434 includes a waveform generator 406. Waveform generator 406 may be electrically connected (e.g., through input/output pins, without limitation) to a waveform-controlled device 430, which may be external to the computing system, without limitation. Waveform generator 406 is configured to generate a waveform 436 responsive to pre-processed waveform data 440, and deliver waveform 436 to waveform-controlled device 430. By way of non-limiting example, the waveform generator 406 may include a PWM or a DAC. Waveform 436 may include an electrical signal (e.g., a voltage potential signal, without limitation) generated based on the pre-processed waveform data 440. Waveform-controlled device 430 is configured to receive waveform 436 from waveform generator 406 and be controlled responsive to waveform 436. By way of non-limiting example, waveform-controlled device 430 may include an electric motor (e.g., a brushless direct current (BLDC) motor, without limitation).

Memory device 404 is configured to store waveform data 416. Waveform data 416 includes sufficient information to enable waveform generator 406 to generate an unmodified waveform (not shown) defined by waveform data 416.

AMA controller 402 is configured to retrieve waveform data 416 from memory device 404 independently from processor 412 (e.g., the AMA controller 402 may be implemented in hardware, in contrast to in firmware/software executed by the processor 412, without limitation). By way of non-limiting example, AMA controller 402 may include a memory interface 428 configured to access waveform data 416 stored by the memory device 404 independently from the host processor 412. A timing engine 424 of a waveform circuitry 414 of the AMA controller 402 may be configured to begin the retrieval of the waveform data 416 from the memory device 404. More specifically, timing engine 424 may be configured to trigger the memory interface 428 to generate waveform data request 432 configured to request waveform data 416 from memory device 404, and memory interface 428 may be further configured to receive waveform data 416 directly from memory device 404 via the memory bus 410 sent in response waveform data request 432. As used herein, the term "directly," as used with reference to receipt of data (e.g., waveform data 416, without limitation), indicates that the data is received without intervention from a processor (e.g., processor 412, without limitation) at the time of receipt of the data, although the processor may be involved with initializing the AMA controller (e.g., AMA controller 402, without limitation) (e.g., loading a memory address of the waveform data to the AMA controller, loading the waveform data to the memory, without limitation). For clarity, the flow of waveform data request 432 and waveform data 416 is shown as bypassing memory bus 410, it being understood that the flow is generally through memory bus 410 as indicated by the general bidirectional arrows.

In initializing the AMA controller 402, the processor 412 configures the AMA controller 402 with information used for initiating an autonomous memory access. For example, the processer 412 may provide, to the AMA controller 402, information regarding a location in the memory device 404 where the waveform data 416 may be accessed. The processor 412 also configures the AMA controller 402 with information regarding a data type of the waveform data 416 and size of the waveform data 416 (e.g., size of a table including the waveform data 416, without limitation). The processor 412 may also indicate, to the AMA controller 402, a destination address for the waveform data 416 (e.g., peripheral device 434, without limitation), as well as provide initial scaling and timing/interpolation setting. After initialization, the AMA controller 402 may perform an autonomous memory access, and the processor 412 may thereafter interact with the AMA controller 402 to reconfigure initialization parameters (e.g., scaling, filtering, timing/interpolation, without limitation), but AMA controller 402 does not require the intervention of processor 412 to continue operation.

AMA controller 402 is configured to pre-process retrieved waveform data 416 to generate pre-processed waveform data 440. By way of non-limiting example, AMA controller 402 may include waveform circuitry 414 (e.g., the waveform circuitry 206 of FIG. 2, without limitation) configured to receive retrieved waveform data 416 from memory interface 428 and autonomously pre-process waveform data 416 independently from processor 412 to generate pre-processed waveform data 440. Waveform circuitry 414 includes scaling engine 418, interpolation engine 420, shaping engine 422, timing engine 424, and filtering engine 426. By way of non-limiting example, scaling engine 418, interpolation engine 420, shaping engine 422, and/or filtering engine 426 may be implemented using processing unit 302 of FIG. 3. Also by way of non-limiting example, timing engine 424 may be implemented using AMA timing controller 308 of FIG. 3.

In some instances scaling engine 418 is configured to generate pre-processed waveform data 440 by modifying received waveform data 416. In such instances, an amplitude of a pre-processed waveform (corresponding to the pre-processed waveform data 440) is different from an unmodified amplitude of the unmodified waveform (corresponding to retrieved waveform data 416). In some embodiments waveform data 416 may include electrical signal values (e.g., voltage potential values, without limitation) for points in time, and scaling engine 418 may be configured to multiply the electrical signal values by a scalar value (e.g., a number greater than one to increase amplitude of waveform 436 relative to the unmodified amplitude, or a number less than one to decrease the amplitude of waveform 436 relative to the unmodified amplitude, without limitation).

In some instances, interpolation engine 420 is configured to modify received waveform data 416 to generate pre-processed waveform data 440. In such instances, a waveform 436 corresponding to the pre-processed waveform data 440 may be interpolated relative to the unmodified waveform corresponding to retrieved waveform data 416. By way of non-limiting examples, interpolation engine 420 may be configured to use a linear interpolation, a spline interpolation, or other interpolation techniques known in the art to interpolate the waveform corresponding to the received waveform data 416 to generate the pre-processed waveform data 440. In some instances the interpolation may facilitate conversion of the unmodified waveform from a first frequency to a second frequency of the waveform 436 (e.g., because conversion from a lower frequency to a higher frequency may require more data points because of a higher Nyquist sample rate required to reconstruct a higher frequency signal). In some instances the interpolation may enable the memory device 404 to store fewer data points, conserving valuable memory resources, because additional points may be later filled in via interpolation.

In some instances, shaping engine 422 is configured to modify received waveform data 416 to generate pre-processed waveform data 440. In such instances, a shape of waveform 436 corresponding to the pre-processed waveform data 440 is different relative to an unmodified shape of an unmodified waveform corresponding to retrieved waveform data 416. By way of non-limiting example, shaping engine 422 may be configured to convert a sinusoidal waveform corresponding to waveform data 416 to a square wave, a triangle wave, a sawtooth wave, or other shape waveform. Also by way of non-limiting example, shaping engine 422 may be configured to invert the unmodified waveform corresponding to waveform data 416.

In some instances, timing engine 424 is configured to modify received waveform data 416 to generate pre-processed waveform data 440. In such instances, a timing of waveform 436 corresponding to the pre-processed waveform data 440 is different relative to an unmodified timing of an unmodified waveform corresponding to retrieved waveform data 416. By way of non-limiting examples, timing engine 424 may be configured to change a frequency and/or a phase of the unmodified waveform corresponding to waveform data 416.

In some instances, filtering engine 426 is configured to modify received waveform data 416 to generate pre-processed waveform data 440. In such instances, waveform 436 corresponding to the pre-processed waveform data 440 is filtered relative to an unmodified waveform corresponding to retrieved waveform data 416. By way of non-limiting example, filtering engine 426 may be configured to apply an unmodified waveform corresponding to retrieved waveform data 416 to a low-pass filter, a high-pass filter, a band-pass filter, a band-gap filter, other filters known in the art, or combinations thereof so as to generate pre-processed waveform data 440.

AMA controller 402 is further configured to provide pre-processed waveform data 440 to peripheral device 434 via peripheral bus 408. By way of non-limiting example, AMA controller 402 may include peripheral device interface 438 configured to interface with one or more peripheral devices such as peripheral device 434 through peripheral bus 408.

Figure 5:
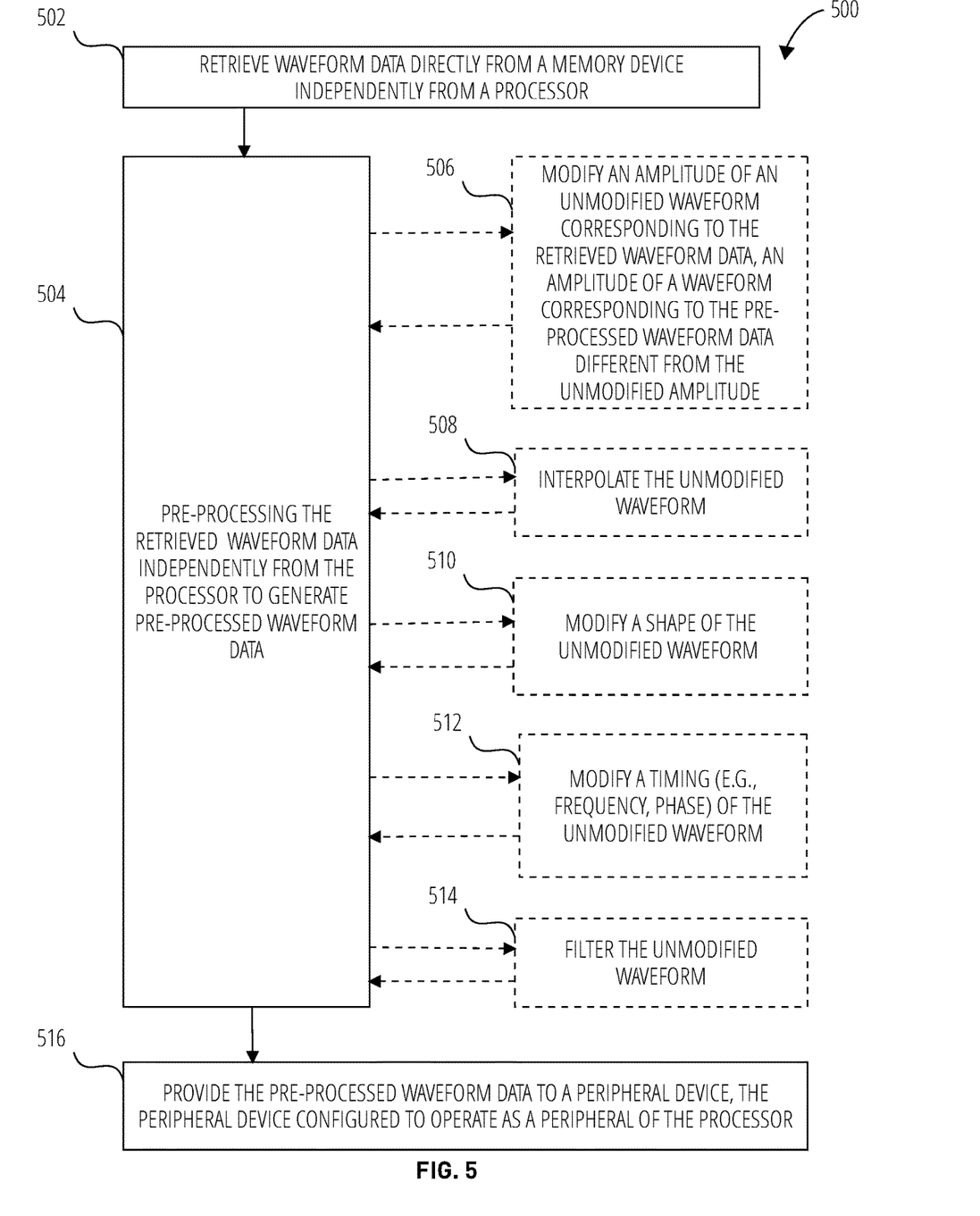
FIG. 5 is a flowchart illustrating a method of operating an AMA controller, according to some embodiments.

FIG. 5 is a flowchart illustrating a method 500 of operating an autonomous memory access (AMA) controller, according to some embodiments. In operation 502, method 500 includes retrieving waveform data directly from a memory device independently from a processor. In operation 504, method 500 includes pre-processing the retrieved waveform data independently from the processor to generate pre-processed waveform data.

In some embodiments, operation 504 includes operation 506, modifying an amplitude of an unmodified waveform corresponding to the retrieved waveform data, an amplitude of a waveform corresponding to the pre-processed waveform data different from the amplitude of the unmodified waveform. In some embodiments, operation 504 includes operation 508, interpolating the unmodified waveform. In some embodiments, operation 504 includes operation 510, modifying a shape of the unmodified waveform. In some embodiments, operation 504 includes operation 512, modifying a timing (e.g., modifying a frequency, modifying a phase, without limitation) of the unmodified waveform. In some embodiments, operation 504 includes operation 514, filtering the unmodified waveform.

In operation 516, method 500 includes providing the pre-processed waveform data to a peripheral device. The peripheral device is configured to operate as a peripheral of the processor.

Figure 6:
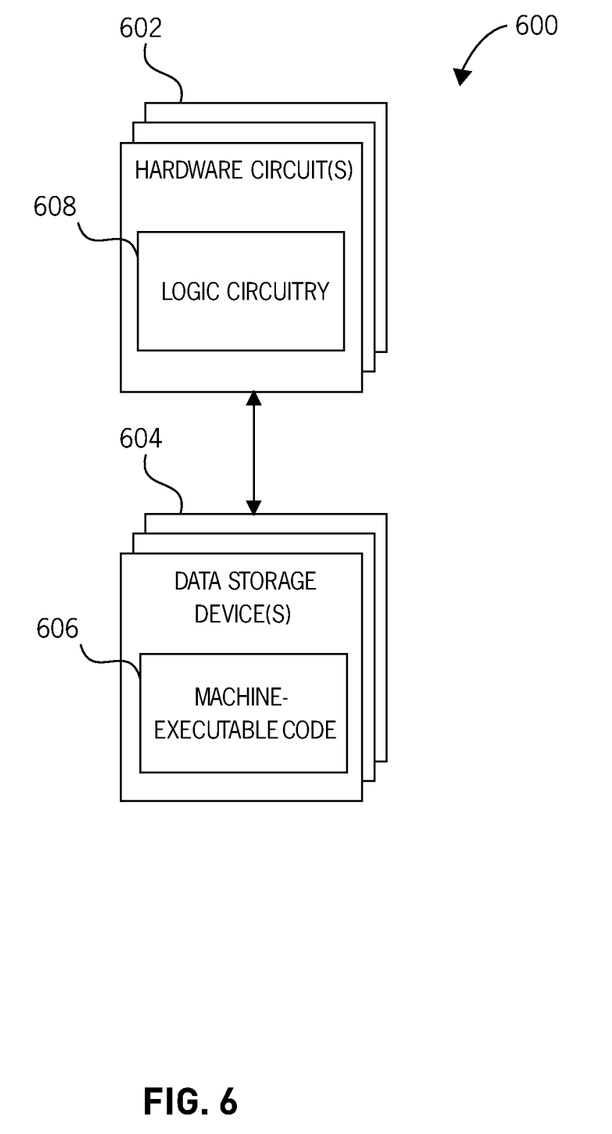
FIG. 6 is a block diagram of circuitry that, in some embodiments, may be used to implement various functions, operations, acts, processes, and/or methods disclosed herein.

It will be appreciated by those of ordinary skill in the art that functional elements of embodiments disclosed herein (e.g., functions, operations, acts, processes, and/or methods) may be implemented in any suitable hardware. FIG. 6 illustrates non-limiting examples of implementations of functional elements disclosed herein. In some embodiments, some or all portions of the functional elements disclosed herein may be performed by hardware specially configured for carrying out the functional elements.

FIG. 6 is a block diagram of circuitry 600 that, in some embodiments, may be used to implement various functions, operations, acts, processes, and/or methods disclosed herein. The circuitry 600 includes one or more hardware circuits 602 (sometimes referred to herein as "hardware circuits 602") electrically connected to one or more data storage devices (sometimes referred to herein as "storage 604"). The storage 604 includes machine-executable code 606 stored thereon and the hardware circuits 602 include logic circuitry 608. The machine-executable code 606 includes information describing functional elements that may be implemented by (e.g., performed by) the logic circuitry 608. The logic circuitry 608 is adapted to implement (e.g., perform) the functional elements described by the machine-executable code 606. The circuitry 600, when executing the functional elements described by the machine-executable code 606, should be considered as special purpose hardware configured for carrying out functional elements disclosed herein. In some embodiments the hardware circuits 602 may be configured to perform the functional elements described by the machine-executable code 606 sequentially, concurrently (e.g., on one or more different hardware platforms), or in one or more parallel process streams.

When implemented by logic circuitry 608 of the hardware circuits 602, the machine-executable code 606 is configured to adapt the hardware circuits 602 to perform operations of embodiments disclosed herein. For example, the machine-executable code 606 may be configured to adapt the hardware circuits 602 to perform at least a portion or a totality of the method 500 of FIG. 5. As another example, the machine-executable code 606 may be configured to adapt the hardware circuits 602 to perform at least a portion or a totality of the operations discussed for the ACB engine 220 of FIG. 2, the waveform circuitry 206 of FIG. 2, the AMA controller 102 of FIG. 1, the AMA controller 200 of FIG. 2 and FIG. 3, the processing unit 302 of FIG. 3, the AMA circuitry 304 of FIG. 3, the modulation parameter controller 306 of FIG. 3, the AMA timing controller 308 of FIG. 3, the AMA controller 402 of FIG. 4, the waveform circuitry 414 of FIG. 4, the scaling engine 418 of FIG. 4, the interpolation engine 420 of FIG. 4, the shaping engine 422 of FIG. 4, the timing engine 424 of FIG. 4, and/or the filtering engine 426 of FIG. 4. As a specific, non-limiting example, the machine-executable code 606 may be configured to adapt the hardware circuits 602 to autonomously pre-process waveform data independently from a processor and provide the pre-processed waveform data to a peripheral device operating as a peripheral to the processor.

The hardware circuits 602 may include a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein.

In some embodiments the storage 604 includes volatile data storage (e.g., random-access memory (RAM)), non-volatile data storage (e.g., Flash memory, a hard disc drive, a solid state drive, erasable programmable read-only memory (EPROM), etc.). In some embodiments the hardware circuits 602 and the storage 604 may be implemented into a single device (e.g., a semiconductor device product, a system on chip (SOC), etc.). In some embodiments the hardware circuits 602 and the storage 604 may be implemented into separate devices.

In some embodiments the machine-executable code 606 may describe hardware (e.g., circuitry) to be implemented in the logic circuitry 608 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog™, SystemVerilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 608 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine-executable code 606 may include an HDL, an RTL, a GL description, a mask level description, other hardware description, or any combination thereof.

In embodiments where the machine-executable code 606 includes a hardware description (at any level of abstraction), a system (not shown, but including the storage 604) may be configured to implement the hardware description described by the machine-executable code 606. By way of non-limiting example, the hardware circuits 602 may include a programmable logic device (e.g., an FPGA or a PLC) and the logic circuitry 608 may be electrically controlled to implement circuitry corresponding to the hardware description into the logic circuitry 608. Also by way of non-limiting example, the logic circuitry 608 may include hard-wired logic manufactured by a manufacturing system (not shown, but including the storage 604) according to the hardware description of the machine-executable code 606.

The logic circuitry 608 is adapted to perform the functional elements described by the machine-executable code 606 when implementing the functional elements of the machine-executable code 606. It is noted that although a hardware description may not directly describe functional elements, a hardware description indirectly describes functional elements that the hardware elements described by the hardware description are capable of performing.

Many of the functional units described in this specification may be labeled as modules, threads, or other segregations of programming code, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Examples

A non-exhaustive, non-limiting list of example embodiments follows. Not each of the example embodiments listed below are explicitly and individually indicated as being combinable with all others of the example embodiments listed below and embodiments discussed above. It is intended, however, that these example embodiments are combinable with all other example embodiments and embodiments discussed above unless it would be apparent to one of ordinary skill in the art that the embodiments are not combinable.

Example 1: An autonomous memory access controller, including: a memory interface configured to access waveform data stored by a memory device independently from a processor in communication with the memory device; a peripheral device interface configured to interface with one or more peripheral devices, the one or more peripheral devices configured to operate as peripherals to the processor; and waveform circuitry configured to autonomously pre-process the accessed waveform data independently from the processor and provide the pre-processed waveform data to the one or more peripheral devices via the peripheral interface.

Example 2: The autonomous memory access controller of Example 1, wherein the one or more peripheral devices include a pulse width modulator.

Example 3: The autonomous memory access controller according to any one of Examples 1 and 2, wherein the one or more peripheral devices include a digital to analog converter.

Example 4: The autonomous memory access controller according to any one of Examples 1-3, wherein the waveform circuitry is configured to pre-process the accessed waveform data by modifying an amplitude of a waveform associated with the accessed waveform data.

Example 5: The autonomous memory access controller according to any one of Examples 1-4, wherein the waveform circuitry is configured to pre-process the accessed waveform data by interpolating the accessed waveform data.

Example 6: The autonomous memory access controller according to any one of Examples 1-5, wherein the waveform circuitry is configured to pre-process the accessed waveform data by modifying a frequency of a waveform associated with the accessed waveform data.

Example 7: The autonomous memory access controller according to any one of Examples 1-6, wherein the waveform circuitry is configured to pre-process the accessed waveform data by modifying a shape of a waveform associated with the accessed waveform data.

Example 8: The autonomous memory access controller according to any one of Examples 1-7, wherein the waveform circuitry is configured to pre-process the accessed waveform data by modifying timing of a waveform associated with the accessed waveform data.

Example 9: A computing system, including: a processor; a peripheral device in communication with the processor via one or more buses, the peripheral device including a waveform generator configured to generate a waveform responsive to pre-processed waveform data; a memory device in communication with the processor via the one or more buses, the memory device configured to store waveform data; and an autonomous memory access (AMA) controller in communication with the memory device via the one or more buses, the AMA controller in communication with the peripheral device via the one or more buses, the AMA controller configured to: retrieve the waveform data from the memory device independently from the processor; pre-process the retrieved waveform data independently from the processor to generate the pre-processed waveform data; and provide the pre-processed waveform data to the peripheral device.

Example 10: The computing system of Example 9, wherein the AMA controller includes waveform circuitry including a scaling engine configured to modify an amplitude of an unmodified waveform corresponding to the retrieved waveform data, an amplitude of a waveform corresponding to the pre-processed waveform data different from the amplitude of the unmodified waveform.

Example 11: The computing system according to any one of Examples 9 and 10, wherein the AMA controller includes waveform circuitry including an interpolation engine configured to interpolate an unmodified waveform corresponding to the retrieved waveform data.

Example 12: The computing system according to any one of Examples 9-11, wherein the AMA controller includes waveform circuitry including a shaping engine configured to modify a shape of an unmodified waveform corresponding to the retrieved waveform data.

Example 13: The computing system according to any one of Examples 9-12, wherein the AMA controller includes waveform circuitry including a timing engine configured to modify a timing of an unmodified waveform corresponding to the retrieved waveform data.

Example 14: The computing system according to any one of Examples 9-13, wherein the AMA controller includes waveform circuitry including a filtering engine configured to filter an unmodified waveform corresponding to the retrieved waveform data.

Example 15: The computing system according to any one of Examples 9-14, wherein the waveform generator includes a pulse width modulator or a digital to analog converter.

Example 16: The computing system according to any one of Examples 9-15, further including a waveform-controlled device configured to receive the waveform from the waveform generator.

Example 17: The computing system of Example 16, wherein the waveform-controlled device includes an electric motor.

Example 18: A method of operating an autonomous memory access controller, the method including: retrieving waveform data directly from a memory device independently from a processor; pre-processing the retrieved waveform data independently from the processor to generate pre-processed waveform data; and providing the pre-processed waveform data to a peripheral device, the peripheral device configured to operate as a peripheral of the processor.

Example 19: The method of Example 18, wherein pre-processing the retrieved waveform data includes one or more of: modifying an amplitude of an unmodified waveform corresponding to the retrieved waveform data, an amplitude of a waveform corresponding to the pre-processed waveform data different from the amplitude of the unmodified waveform; interpolating the unmodified waveform corresponding to the retrieved waveform data; modifying a shape of the unmodified waveform corresponding to the retrieved waveform data; modifying a timing of the unmodified waveform corresponding to the retrieved waveform data; and filtering the unmodified waveform corresponding to the retrieved waveform data.

Example 20: The method of Example 19, wherein modifying the timing of the unmodified waveform corresponding to the retrieved waveform data includes modifying a frequency or a phase of the unmodified waveform.

CONCLUSION

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventors.

What is claimed is:

1. An apparatus, comprising:
a memory device to store waveform data corresponding to a waveform;
a processor; and
a waveform circuitry to autonomously pre-process the waveform data independently from the processor and provide the pre-processed waveform data to one or more peripheral devices, a pre-processed waveform corresponding to the pre-processed waveform data different from the waveform.

2. The apparatus of claim 1, comprising a pulse width modulator, wherein the waveform circuitry is to provide the pre-processed waveform data to the pulse width modulator.

3. The apparatus of claim 1, comprising a digital to analog converter, wherein the waveform circuitry is to provide the pre-processed waveform data to the digital to analog converter.

4. The apparatus of claim 1, wherein the waveform circuitry comprises a scaling engine to modify an amplitude of the waveform corresponding to the waveform data to generate the pre-processed waveform data.

5. The apparatus of claim 1, wherein the waveform circuitry comprises an interpolation engine to interpolate the waveform corresponding to the waveform data to generate the pre-processed waveform data.

6. The apparatus of claim 1, wherein the waveform circuitry comprises a timing engine to modify a timing of the waveform corresponding to the waveform data to generate the pre-processed waveform data.

7. The apparatus of claim 1, wherein the waveform circuitry comprises a shaping engine to modify a shape of the waveform corresponding to the waveform data to generate the pre-processed waveform data.

8. The apparatus of claim 1, wherein the waveform circuitry comprises a filtering engine to filter the waveform corresponding to the waveform data to generate the pre-processed waveform data.

9. The apparatus of claim 1, further comprising an electric motor to receive the pre-processed waveform data, the electric motor controlled responsive to the pre-processed waveform data.

10. A method, comprising:
retrieving waveform data from a memory device;
pre-processing the retrieved waveform data independently from a processor to generate pre-processed waveform data, a pre-processed waveform corresponding to the pre-processed waveform data different from a waveform corresponding to the retrieved waveform data; and
providing the pre-processed waveform data to a peripheral device, the peripheral device to operate as a peripheral of the processor.

11. The method of claim 10, wherein pre-processing the retrieved waveform data comprises modifying an amplitude of the waveform corresponding to the retrieved waveform data, an amplitude of the pre-processed waveform corresponding to the pre-processed waveform data different from the amplitude of the waveform.

12. The method of claim 10, wherein pre-processing the retrieved waveform data comprises interpolating the waveform corresponding to the retrieved waveform data.

13. The method of claim 10, wherein pre-processing the retrieved waveform data comprises modifying a shape of the waveform corresponding to the retrieved waveform data.

14. The method of claim 10, wherein pre-processing the retrieved waveform data comprises modifying a timing of the waveform corresponding to the retrieved waveform data.

15. The method of claim 14, wherein modifying the timing of the waveform corresponding to the retrieved waveform data comprises modifying one or more of a frequency or a phase of the waveform.

16. The method of claim 10, wherein pre-processing the retrieved waveform data comprises filtering the waveform corresponding to the retrieved waveform data.

17. An apparatus, comprising:
a memory interface to access waveform data stored by a memory device;
a peripheral device interface to interface with one or more peripheral devices, the one or more peripheral devices to operate as peripherals to a processor; and
a waveform circuitry to autonomously pre-process the accessed waveform data independently from the processor and provide the pre-processed accessed waveform data to the one or more peripheral devices via the peripheral device interface.

18. The apparatus of claim 17, wherein the waveform circuitry comprises a scaling engine to modify an amplitude of a waveform corresponding to the waveform data to generate the pre-processed accessed waveform data.

19. The apparatus of claim 17, wherein the waveform data includes signal values of a waveform corresponding to the waveform data at different points of time.

20. The apparatus of claim 17, wherein the waveform data includes mathematical coefficients to define a waveform corresponding to the waveform data using a mathematical function of the mathematical coefficients.

* * * * *

UNITED STATES PATENT AND TRADEMARK OFFICE
CERTIFICATE OF CORRECTION

PATENT NO. : 11,847,076 B2
APPLICATION NO. : 17/805642
DATED : December 19, 2023
INVENTOR(S) : Jacob Lunn Lassen It is certified that error appears in the above-identified patent and that said Letters Patent is hereby corrected as shown below:

In the Specification

Column 3, Line 45, change "format lxx and" to --format 1xx and--

Signed and Sealed this
Twenty-third Day of April, 2024

Katherine Kelly Vidal
*Director of the United States Patent and Trademark Office*